United States Patent [19]

Redington

[11] 4,428,668

[45] Jan. 31, 1984

[54] RANGE INDICATING DEVICE

[76] Inventor: Gordon Redington, 1759 N. Jackson St., St. Paul, Minn. 55117

[21] Appl. No.: 305,118

[22] Filed: Sep. 24, 1981

[51] Int. Cl.³ .............................................. G01C 3/24
[52] U.S. Cl. ........................................ 356/17; 33/278
[58] Field of Search ....... 356/3, 7, 8, 9, 10, 15, 17, 18, 20, 21, 22, 253, 254, 255; 33/276, 277, 278, 265

[56] References Cited

U.S. PATENT DOCUMENTS

| | | | |
|---|---|---|---|
| 1,311,253 | 7/1919 | Stern | 356/21 |
| 2,058,484 | 10/1936 | Mihalyi | 356/17 |
| 2,285,498 | 6/1942 | David | 356/21 |
| 2,788,701 | 4/1959 | Browning | 88/2.3 |
| 3,170,698 | 2/1965 | Schoeffler et al. | 356/255 |
| 3,923,396 | 12/1975 | Ewald | 356/17 |
| 4,167,333 | 9/1979 | Young | 356/247 |
| 4,231,162 | 11/1980 | Button | 33/284 |

Primary Examiner—R. A. Rosenberger
Attorney, Agent, or Firm—Leo Gregory

[57] ABSTRACT

An optical range indicating device, having no moving parts, having a pair of mirrors arranged to embody the principle of triangulation, one of the mirrors being positioned to sight the object to be viewed and having thereon distance indicating indicia, the other mirror being positioned to provide a view of the image of the sighted object and of the distance indicating indicia the mirrors being unitarily pivoted about an axis to align a direct line of sight view of the sighted object with the reflected image of the sighted object superposed upon the reflected image of the distance indicating indicia as seen on the other mirror to indicate the distance to the sighted object.

4 Claims, 8 Drawing Figures

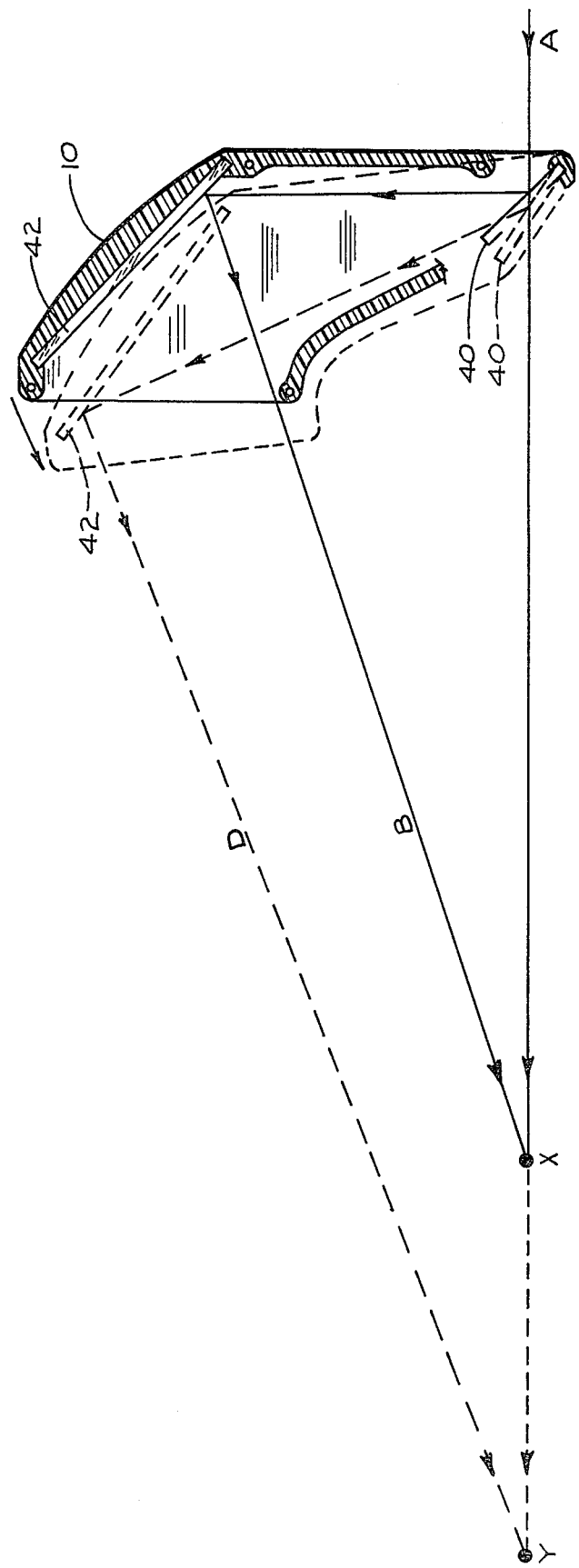
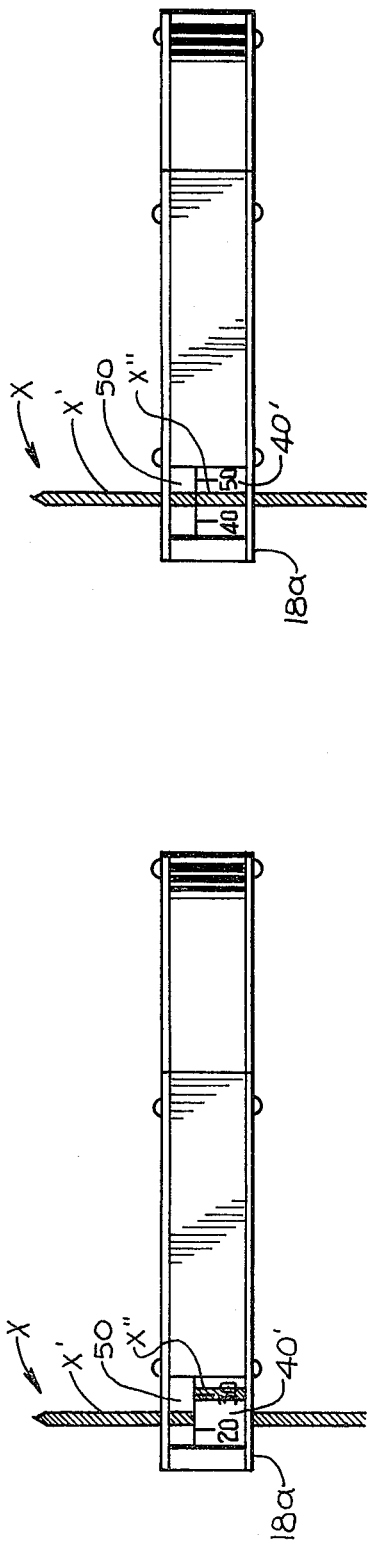
FIG. 8
FIG. 7
FIG. 6

RANGE INDICATING DEVICE

BACKGROUND OF THE INVENTION

1. Field of the Invention

This invention relates to a range indicating device having no moving parts and embodying a pair of coordinated mirrors utilizing the principle of triangulation to indicate the distance to a sighted object.

2. Description of the Prior Art

Prior art range finding or indicating devices which embody an optical system require the use of moveable parts. Some of the devices merely bring the sighted object into a focus, some bring images of sighted objects into alignment by adjusting the angles of the mirrors used, some indicate a target point making an allowance for trajectory as for hunting purposes, some indicate distance to a sighted object, and some require the sighted object to be of a given size for its distance to be accurately indicated.

SUMMARY OF THE INVENTION

It is desirable and an object of this invention to have a range indicating device which indicates the distance to a sighted object with no requirement for adjustment or relative movement of parts. It is also desirable for hunting purposes to have such a range finding or indicating device that it may be attached to the hunting weapon, such as an archery bow, to provide a quick accurate distance measurement to a sighted object.

It is another object of this invention in a range indicating device to embody a pair of stationary mirrors, one of which reflects an image of the sighted object and the other of which views the reflected image of the sighted object, the sighting mirror having distance measurement indicia thereon and by utilizing the principle of triangulation, a direct line of sight view of the sighted object is aligned with the reflected view thereof upon the viewing mirror and upon the indicia reflected thereon to readily ascertain the distance to the sighted object.

More specifically, it is an object of this invention to provide a range indicating device embodying a mirror which has distance measurement indicia thereon and which reflects an image of the sighted object, a second mirror in which is viewed the reflected image of the sighted object and of said indicia of said sighting mirror, the operator viewing a portion of the image by a direct line of sight and viewing a portion of the image as reflected upon said second mirror, pivots said device on an axis adjacent said second mirror to align both portions of the sighted object upon the reflected image of said measurement indicia as viewed in said second mirror to ascertain the distance to said sighted object.

These and other objects and advantages of the invention will be set forth in the following description made.

A BRIEF DESCRIPTION OF THE DRAWINGS

FIGS. 6 and 7 are views similar to FIGS. 2 and 4 showing a modification; and

FIG. 8 is a diagramatic view in section illustrating by extended lines of sight the principles of determining distance.

DESCRIPTION OF A PREFERRED EMBODIMENT

Figure 1:
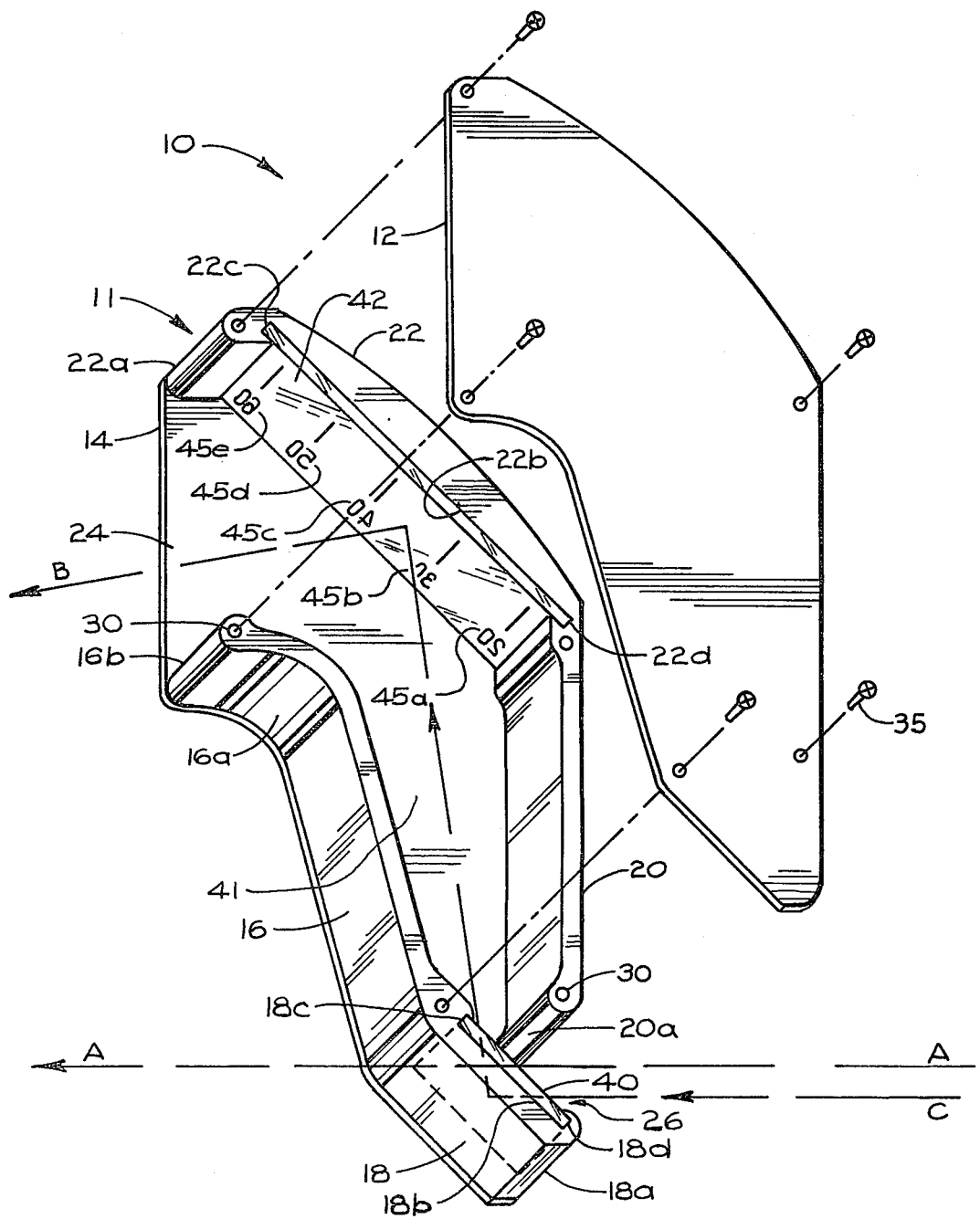
FIG. 1 is an exploded view in perspective.

Essentially, the device herein consists of a pair of particularly arranged or coordinated mirrors in connection with indicia of distance measurement on one of the mirrors to readily ascertain the range or distance of a sighted object, as herein described.

With reference to the drawings, the range indicating device herein is referred to generally by the number 10.

Said device in the present embodiment consists of a housing 11 having an elongated angular form in plan and having parallel spaced top and bottom walls 12 and 14, a front wall 16 having a rearwardly angled end portion 18 forming an end wall and having its other end portion forwardly curved as at 16a, a rear wall 20 having, as here shown, a diverging angled relationship with said front wall 16, said rear wall having an extended portion 22 angled in the direction of said front wall portion 16a and here shown having its outer end surface portion convexly curved. Said front wall portion 16a and said extended wall portion 22 have spaced terminal portions 16b and 22a respectively forming therebetween an opening 24.

Said rear wall 20 has its end or terminal portion 20a spaced from the adjacent terminal portion 18a of said end wall 18 forming therebetween an opening 26.

Said wall structure above described will be secured in a conventional manner as indicated in FIG. 1. The side walls 16 and 20 are apertured as at 30 and in connection with corresponding aligned holes in said top and bottom walls 12 and 14, said housing is shown to be secured as by said screws 35.

Referring particularly to FIG. 1, said end wall 18 is shown having formed within the inner side thereof a channel 18b having opposed facing grooves 18c and 18d. Disposed and secured within said channel and grooves is a mirror 40, the same to be further described.

Formed within the inner side of wall 22 in an angular relation to the channel 18b is a relatively wide channel 22b having opposed facing grooves 22c and 22d and having disposed and secured therein a mirror 42.

The mirror 42 will sometimes be referred to as the sighting mirror and the mirror 40 will sometimes be referred to as the viewing mirror.

The unobstructed chamber 41 within said housing provides a clear passage or space between said mirrors.

The mirror 42 carries thereon indicia 45 which herein comprises distance markers here indicating 20–60 yard increments respectively as indicated by the numerals 45a–45e. Indicia may otherwise be provided to appear upon the mirror 42 for reflection as an image thereof upon the mirror 40. The mirrors are arranged to have what is sighted by the mirror 42 appear as an image upon the viewing mirror 40.

Referring to FIGS. 6 and 7, a modification is shown providing a direct view through the housing as at 50 and in connection therewith in the present embodiment the mirror 40 is here indicated at 40' as having a clear window or an opening for a direct visual sighting of an object by the operator, a window is here indicated.

Figure 2:
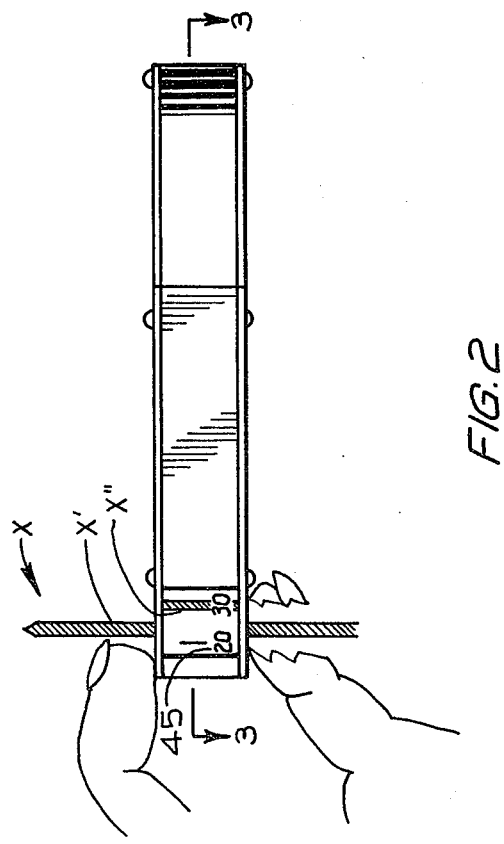
FIG. 2 is a rear elevational view.

Referring to FIG. 2, the object viewed is indicated by the character X. The lines of sight are indicated by the characters A, B, C and D with regard to FIGS. 3, 5, and 8.

Referring again to FIG. 2, the direct sight of the operator is either over the upper edge of the device or as indicated in FIG. 6, it is through the window or opening 50 in the upper portion of the viewing mirror 40'.

By a direct line of sight, the operator views the portion X' of the object.

Figure 3:
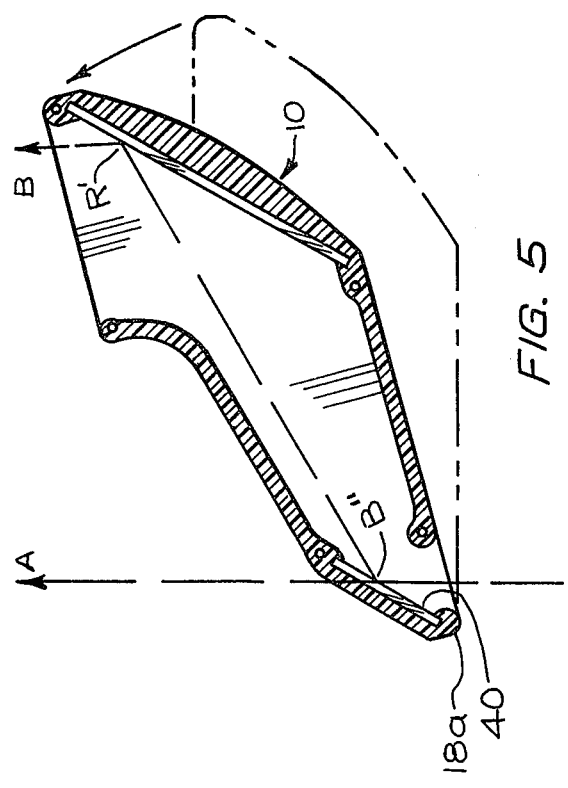
FIG. 3 is a view in horizontal section taken on line 3—3 of FIG. 2.

The sight line B is the line along which the mirror 42 sights the object and the image of said object is reflected upon the mirror 40 as indicated X" and the reflection is upon said mirror 40 at the point B' as viewed by the operator along the sight line C, as in FIG. 3.

Figure 4:
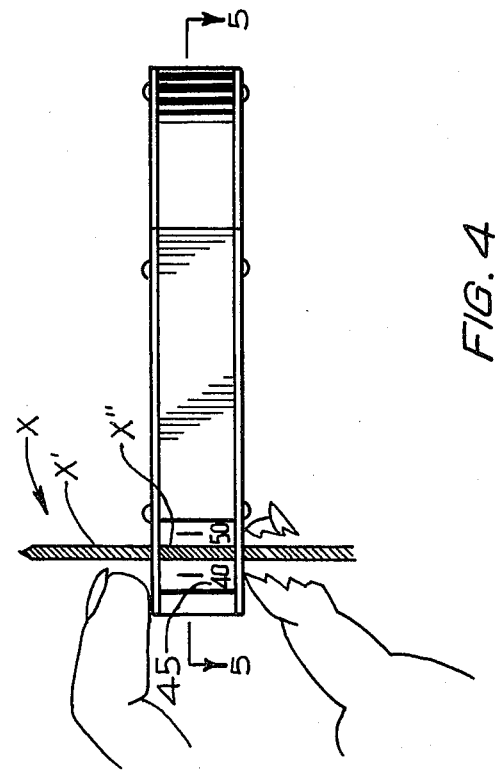
FIG. 4 is a view similar to that of FIG. 2 in an alternate position.
Figure 5:
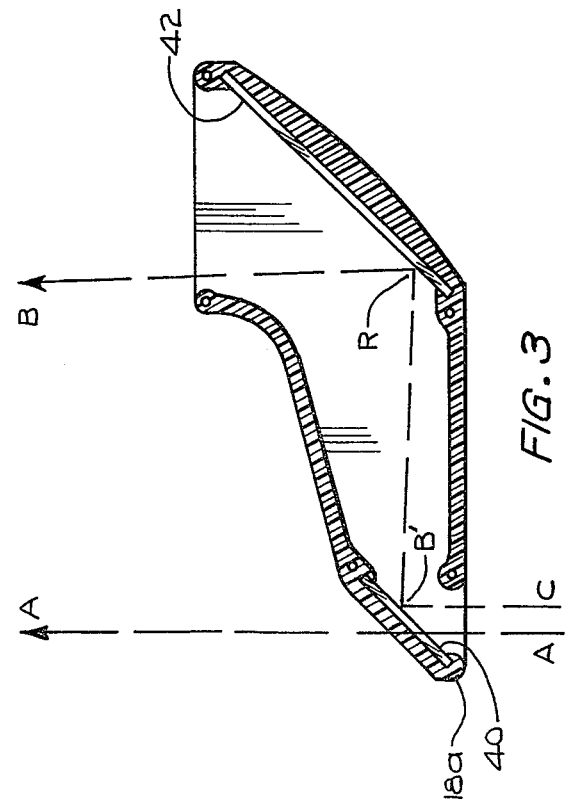
FIG. 5 is a view in horizontal section taken on line 5—5 of FIG. 4 as indicated.

To ascertain the distance of said object, it is necessary that the object portions X' and X" viewed as a split or misaligned object be brought into alignment as indicated in FIGS. 4 and 5. It will be noted that in FIG. 5, the point B' coincides with the sight line A and the sight lines A and C coincide.

It will be noted that to bring the portions viewed of the object into alignment, the device 10 has been pivoted at the vertical axis at 18a to change the point of reflection upon the mirror 42 from R to R'.

With regard to FIGS. 6 and 7, the function or operation is the same except that instead of viewing a portion of the object X over the edge of the device, the operator views the object partially through the window 50 in the mirror 40' and views the object partially as a reflected image in the mirror 40'.

The indicia 45 is reflected in the mirror 40 and the point upon which the image portions are brought into alignment as if superposed over the image of said indicia indicates the distance of the sighted object. The distance between numbered increments can be accurately estimated. Smaller increments of measure than those here indicated may be used.

The minimum and maximum range of the device for sighting objects can be determined by the relative angular positions of the mirrors 40 and 42 and with regard to the length of the mirror 42. Such determining will be apparent to one skilled in the art, as is also the extension of the range of the device by a concave curvature of the mirror 42 in lieu of extending it. This is within the concept of the invention herein.

Referring to FIG. 8, a diagramatic showing is made of how the two mirrors can embody the principal of triangulation to determine various distances although a fixed angular relationship is maintained between the two mirrors. Point X is a sighted object at the minimum distance that can be indicated on the device and point Y is a sighted object at the maximum distance. The sight lines intersecting those points and the device are in alignment such as illustrated in FIGS. 4 and 5. The dotted line view of the device indicates its position when in alignment to indicate the distance to a sighted object at the maximum distance that can be indicated on the device. The solid view indicates its position when in alignment to indicate the distance to a sighted object at the minimum distance that can be indicated.

Note that intermediate distances between X and Y will triangulate into alignment at intermediate positions along mirror 42. The location along mirrors 42 at which the reflected view of the sighted object will be viewed when the device is in the aligned position, in conjunction with the distance indicating indicia also along mirror 42, indicates the distance to the sighted object.

The device, as indicated in FIGS. 2 and 4, is held between thumb and forefinger and the object of interest is sighted as above described.

The line A is the direct sighting line of the operator, the line C is the line of viewing the object as an image on the mirror 40. For example, the image is first sighted by the mirror 42 along one line B with the image thereof appearing upon the mirror 40 at the point B'. Thus a split image is seen as indicated in FIG. 2.

By movement of the device 10 pivoting upon a vertical axis at 18a as indicated by the arrow, the sighted object along the line B has its reflection upon the mirror 42 shifted to the right as viewed in FIG. 5 and as a consequence the sight lines A and D merge upon the object sighted as at Y in FIG. 8 and the split image as seen by the operator in FIGS. 2 or 6 comes into alignment at the point B" as in FIG. 5, at which point the distance of the object is indicated with reference to the image of the indicia 45 upon the mirror 40 or 40', as the case may be. In usage, the position of the line D, which indicates the image of the sighted object, will be at whatever position upon the mirror 42 at which the split image portions of the object sighted can be brought into alignment as in FIGS. 4 or 7.

Thus it is seen that the use of the device is simple to use to obtain an accurate and quick reading of distance.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. An optical device to indicate a measured distance to a sighted object, having in combination
  a unitary device, of which all parts thereof have no relative movement, comprising
  a housing having an elongated angular form in plan having a pair of spaced top and bottom walls having therebetween a pair of spaced side walls in an opposed relation,
  one of said side walls having an angled portion conforming to the perimeter of the top and bottom walls thereabove and therebelow, a mirror carried by said angled wall portion facing in the direction of a sighted object,
  said side walls having a pair of corresponding end wall portions spaced apart to permit said mirror to have a line of sight to sighted object and to bear the image of said object,
  indicia on said mirror comprising distance measurement markers,
  said side walls having their corresponding other end portions spaced apart to form a window,
  a mirror aligned with said window positioned to reflect the image of a sighted object and the measurement markers from said first mentioned mirror,
  the other of said side walls carrying said second mentioned mirror upon a portion thereof to be seen through said window,
  wherein views of the sighted object are sighted partially by direct line of sight by the operator and partially by reflection upon said second mentioned mirror of the image of the sighted object upon said first mentioned mirror and by coincidence of said views upon a reflected measurement marker upon said second mentioned mirror by pivoting said housing upon a vertical axis to ascertain the distance of the sighted object.

2. An optical device to indicate a measured distance to a sighted object, having in combination a unitary device having no parts thereof having relative movement, comprising a housing having an elongated angular form in plan having a pair of spaced top and bottom walls having therebetween a pair of spaced side walls in an opposed relation, one of said side walls having an angled portion, a mirror carried by said angled portion facing in the direction of a sighted object, and side walls having a pair of corresponding end wall portions spaced to permit said mirror to have a line of sight to a sighted object and to bear the image of said object, indicia on said mirror comprising distance measurement markers, said side walls having their corresponding other end portions spaced apart in the plane of a straight portion of said one of said side walls to form a window, a mirror aligned with said window positioned to reflect the image and markers from said first mentioned mirror, the other of said side walls carrying said second mentioned mirror on a portion thereof, whereby views of the sighted object are sighted partially by direct line of sight of the operator and partially by reflection in said second mentioned mirror and said views are brought into coincidence upon a reflected measurement marker by pivoting said housing upon a vertical axis to ascertain the distance of the sighted object.

3. The structure set forth in claims 1 or 2, including an opening in said housing viewed through said window providing a direct line of sight to the sighted object by the operator.

4. The structure set forth in claims 1 or 2 wherein said vertical axis for pivoting said housing being adjacent said window.

* * * * *